(12) United States Patent
Nunez et al.

(10) Patent No.: US 7,851,539 B2
(45) Date of Patent: Dec. 14, 2010

(54) REDUCED VOC COATINGS USING CHEMICALLY MODIFIED HYPERBRANCHED POLYMERS

(75) Inventors: Carlos M. Nunez, Cary, NC (US); Geddes H. Ramsey, Pigeon Forge, TN (US); Pamela M. Barfield, Apex, NC (US); Larry G. Jones, Cary, NC (US); Anthony L. Andrady, Durham, NC (US)

(73) Assignee: The United States of America as represented by the Administrator of the United States Environmental Protection Agency, Washington, DC (US)

( * ) Notice: Subject to any disclaimer, the term of this patent is extended or adjusted under 35 U.S.C. 154(b) by 617 days.

(21) Appl. No.: 11/536,140

(22) Filed: Sep. 28, 2006

(65) Prior Publication Data

US 2008/0090944 A1     Apr. 17, 2008

(51) Int. Cl.
*C08L 51/00* (2006.01)
*C08G 18/42* (2006.01)

(52) U.S. Cl. .................. 524/504; 523/201; 523/205; 528/271; 524/604

(58) Field of Classification Search ............. 524/500, 524/504; 523/201; 528/271
See application file for complete search history.

(56) References Cited

U.S. PATENT DOCUMENTS

| | | | |
|---|---|---|---|
| 6,258,896 B1 * | 7/2001 | Abuelyaman et al. | 525/437 |
| 6,787,598 B2 * | 9/2004 | Jans et al. | 524/539 |
| 2002/0193471 A1 * | 12/2002 | Jans et al. | 524/88 |
| 2003/0144457 A1 * | 7/2003 | Brinkhuis | 528/272 |
| 2004/0024087 A1 * | 2/2004 | Bruchmann et al. | 523/160 |
| 2004/0170767 A1 * | 9/2004 | Flosbach et al. | 427/385.5 |
| 2006/0247387 A1 * | 11/2006 | Mohanty et al. | 525/413 |

* cited by examiner

*Primary Examiner*—Tae H Yoon

(57) ABSTRACT

Reduced VOC coatings are provided that include small amounts of modified hyperbranched polymers added and reduced solvents to reduce VOC levels by as much as 30% and more. The reduced VOC coatings have substantially improved flow and performance characteristics over comparable commercially available reduced VOC coatings.

18 Claims, 1 Drawing Sheet

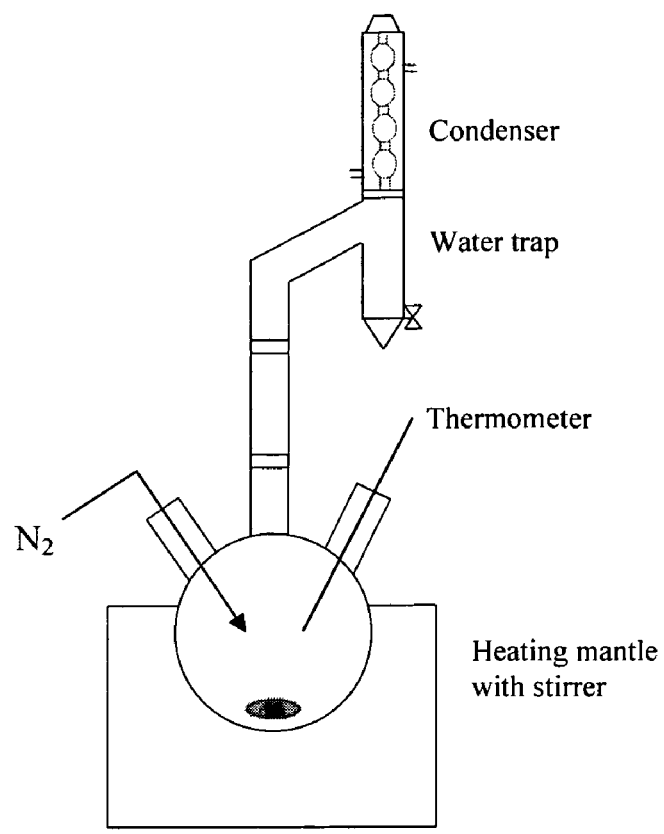
Figure 1. Apparatus for preparation of modified hyperbranched polymers.

REDUCED VOC COATINGS USING CHEMICALLY MODIFIED HYPERBRANCHED POLYMERS

FIELD OF THE INVENTION

This invention relates generally to reduced-VOC coatings. More specifically, this invention relates to the use of chemically modified hyperbranched polymers in coatings to reduce the content of VOCs therein.

BACKGROUND OF THE INVENTION

Volatile organic compounds (hereinafter "VOCs") are an important health and environmental concern. Volatile Organic Compounds (VOCs) are organic chemicals that have a high vapor pressure and easily form vapors at normal temperature and pressure. Volatile organic chemicals (VOCs) are emitted as gases from certain solids or liquids. There may be several different VOCs present in one product.

VOCs are emitted by a wide array of coatings including polyurethane topcoats, residential and commercial real estate oil-based and water-based coatings, as well as industrial thermoset baking enamels and finishes that are specifically formulated for use in automotive, transportation, marine, and industrial maintenance markets and in a variety of product finishes. "Coatings" as used herein include architecture coatings; wood furniture and fixture coatings; metal furniture and fixture coatings; metal container and closure coatings; coil, sheet and strip coatings; appliance coatings; automotive and other transportation coatings; aerospace coatings; machinery and equipment coatings; electrical and electronic coatings; paper, plastic, film, and foil coatings, marine paints and coatings; industrial maintenance coatings; auto refinishing coatings, traffic paints; aerosol paints; and other industrial product finishes or the like.

Coating operations release a significant portion of the non-mobile source emissions of volatile organic compounds (VOCs) into the air. Prior studies have indicated that the percentage of VOC emissions from coating operations may be as high as 10-15%. Controlling emissions from these sources is difficult, due to the fact that a large portion of the responsible sources are small, widely distributed facilities. This is particularly true in the automotive refinishing sector. For these operations add-on controls are prohibitively expensive; thus the regulatory focus has been on controlling the VOC content of coatings. National emission standards limit the volatile organic compound content of coatings. For example, national standards for volatile organic compounds (VOCs) in automobile refinishing operations were promulgated in 1998 (United States Federal Register, v. 63). The rule requires coating manufacturers to limit VOC content in the paints they sell; VOC limits for various categories of auto refinishing coatings are shown in Table 1-1. In addition, due to local air pollution problems, many southern California counties in the United States have mandated laws that further reduce the allowable VOC content to 420 g/L (3.5 lb/gal) for automotive refinishing applications. National VOC emission standards for other coating industries are similarly restrictive.

TABLE 1-1

Volatile Organic Compound (VOC) Limits for Automotive Refinishing Coatings (Federal Register, v. 63)

| Coating Category | Grams VOC per liter | Pounds VOC per gallon* |
|---|---|---|
| Pretreatment Wash Primer | 780 | 6.5 |
| Primer/Primer Surfacer | 580 | 4.8 |
| Primer Sealer | 550 | 4.6 |
| Single/2-stage Topcoats | 600 | 5.0 |
| Topcoats of more than two stages | 630 | 5.2 |
| Multi-colored topcoats | 680 | 5.7 |
| Specialty coatings | 840 | 7.0 |

*English units are provided for information only. Regulation enforcement will be based on the metric levels.

There are generally three parts to a coating: pigments, the binder (usually a natural or synthetic resin), and one or more solvents. The pigments are usually insoluble powders that may provide color and also help make the paint or coating opaque. The binder or resin is that part of the vehicle which eventually solidifies to form part of the dried paint film or coating. The binder or resin may be based on thermoplastic polymers. The solvent or diluent (often an organic solvent, or water) is that part of the vehicle that is volatile and does not become part of the coating finish. The emission of VOCS from coatings is primarily from the solvents therein. The major function of the solvents is to thin the coating to make it easier to apply by spraying or the like.

There are also exempt solvents. An exempt solvent is a volatile organic compound that does not participate in an atmospheric photochemical reaction to form smog. It can be an organic solvent but it takes so long to react with nitrogen oxides (NOx) in the presence of sunlight that its reactivity is believed to be negligible. Only a small number of exempt solvents are approved for use in paints and coatings. These include acetone, methyl acetate, PCBTF (Oxsol 100), and volatile methyl siloxanes. After application, liquid coatings solidify, leaving the binder and pigment as a colored coating. Depending on the type of binder, this hardening may be a result of processes such as curing, evaporation, cooling, etc.

In recognition of the health and environmental problems caused by VOC emissions in coatings, there have been attempts made to minimize or eliminate the use of VOCs whenever possible. For example, several manufacturers have reformulated their paints and paint additives in an effort to replace or reduce the solvents in order to eliminate or reduce VOCs during compounding or use of the paint or paint additives. Unfortunately, the use of these reformulated paints and paint additives has been limited due to performance issues.

Accordingly, there has been a need for novel reduced-VOC coatings with reduced amounts of solvent to substantially reduce VOCs to improve public health and benefit industries which are facing increased restrictions related to air emissions. There is a still further need for novel reduced-VOC coatings with improved performance characteristics. There is an additional need for alternative coatings with lower VOCs than the current commercial "reduced-VOC" coatings, that do not use exempt solvents and with ASTM and weathering properties comparable to conventional coatings. There is a still further need for novel reduced-VOC coatings with improved resin and solvent compatibility. The present invention fulfills these needs and provides other related advantages.

SUMMARY OF THE INVENTION

The present invention resides in improved reduced VOC coatings that require less solvent for application and have performance characteristics that are comparable or better than conventional "reduced VOC" coatings. The reduced-VOC coatings comprise, generally, at least one pigment, at least one resin and at least one modified hyperbranched polymer that replaces a fraction of the at least one resin to lower the viscosity of the reduced-VOC coating thus reducing the amount of solvent necessary to apply the coating. Reductions in photochemically reactive and toxic solvent emissions affecting public health may therefore be achieved.

Other features and advantages of the present invention will become apparent from the following more detailed description, taken in conjunction with the accompanying drawings which illustrate, by way of example, the principles of the invention.

BRIEF DESCRIPTION OF THE DRAWING

The accompanying drawings illustrate the invention. In such drawings:

FIG. 1 is a schematic view of an apparatus for preparation of modified hyperbranched polymers.

DETAILED DESCRIPTION OF THE PREFERRED EMBODIMENTS

The present invention is concerned with reduced-VOC coatings. In a first embodiment, the reduced VOC coating comprises at least one pigment, at least one resin with a fraction thereof replaced by at least one modified hyperbranched polymer (HBP), and at least one added solvent. The at least one modified hyperbranched polymer may replace from about two to about six percent by weight of the at least one resin.

The at least one pigment may be any known pigment typically found in coatings, for example, titanium dioxide or the like.

The at least one resin comprises high solids acrylic/polyurethane resins (polyols). The at least one resin comprises resin solids and at least one solvent. The percentage of solids by weight ranges from about 70% to about 80%. The percentage of the solvent by weight in the resin totals 100%. The solvent in the resin may differ from the added solvent used to make the coating. Suitable resins include Joncryl 510, Joncryl 920 available from Johnson Polymer, Sturtevant, Wis., and 192BL80 available from Cognis Corporation, Ambler, Pa., although other high solids acrylic polyols may be used within the confines of the invention. The resins may be high-solids, although substantial benefit may be derived from resins that are not high solids, depending on the formulation.

As used herein, a "hyperbranched polymer" (HBP) means dendritic polymers belonging to a special class of macromolecules called "dendrimers." The dendritic polymers in general, and hyperbranched in particular, are unique in that at comparable average molecular weights, their solution viscosity is considerably less than that of linear polymers. The lower viscosity of even relatively concentrated solutions of hyperbranched polymers allows their use in novel high-solids coating formulations. They may also be used as blends with conventional linear high solids coating formulations to obtain good film-forming properties in the coating formulation. The unique molecular geometry of the dendrimers results in physical properties atypical of polymers. Unlike conventional polymers, dendritic polymers have a highly branched cascade structure. Generally, these are synthesized by stepwise condensation of multifunctional (generally trifunctional) monomers about a multifunctional core molecule. This produces a layered spheroid product of which the size depends on the number of layers or generations (G). As the functionalities available for subsequent reaction double with each condensation step (or generation), the larger dendrimers have a large number of surface functionalities per macromolecule. Simple mathematical expressions relate the generation number G, the molecular weight, and the number of functional groups per macromolecule. While the maximum achievable generation number might be invariably limited by branching defects as well as steric factors, dendrimers with G=10 and a molecular weight approaching a million have been prepared. The highest generation commercially manufactured is currently G=5. The more generations, the more expensive the hyperbranched polymers. Hyperbranched polymers have functional groups that can be readily modified to alter the solubility of the hyperbranched polymers and to provide other properties. The types of hyperbranched polymers that may be used depends on the number of functional groups modified to produce a coating with a desired solids content. Suitable hyperbranched polymers are commercially available. A suitable supplier is Perstorp (Toledo, Ohio).

The VOC content of conventional coatings, based on thermoplastic polymers, may be reduced by replacing some fraction of the linear polymer or prepolymer (i.e. the resin) in the coating by the hyperbranched polymer. Because hyperbranched polymers have lower viscosities than their straight-chain counterparts, they may be used as resin modifiers in the reduced-VOC coatings, since resins with lower viscosity will require less dilution with solvent (reduce the use of solvents) to make them useful for spray application. When combined with high-solids resins (i.e. resins with solids content greater than about 70%) to give the necessary mechanical properties, the use of hyperbranched polymers in coatings represent a novel method of meeting emissions goals.

To allow the hyperbranched polymers to be blended into the prepolymer systems and/or base solvents used in the coating formulation, the functional end groups of the hyperbranched polymer may have to be chemically modified. For example, commercially available hyperbranched polyesters may be OH terminated and do not dissolve in common nonpolar organic solvents or in prepolymers used in thermoset formulations. Therefore, the partial conversion of these OH groups into alkyl and other groups helps achieve better solubility and blending characteristics. As used herein, "modified hyperbranched polymer" means a hyperbranched polymer that has been chemically modified to provide functional end groups to make the hyperbranched polymer more compatible with the resins and solvents used in coatings and when cured, there should be substantially no impairment in the cross-linking.

In the case of hydroxyl terminated hyperbranched polymers, the polar hyperbranched polymers may be partially or completely esterified by at least one acid to produce weakly polar or entirely nonpolar modified hyperbranched polymers compatible with common solvents. A nonpolar hyperbranched polymer may be modified by known methods to similarly balance the polarity of the hyperbranched polymer. The nonpolar hyperbranched polymer may be reacted with a halogen (e.g. chlorine and/or bromine) to produce alkyl halides and then converted to polar hyperbranched polymers with OH functional groups by hydrolysis of the halides in the presence of aqueous sodium hydroxide. Although OH terminated hyperbranched polymers have been described, it is to be appreciated that hyperbranched polymers having different functional groups may be used within the confines of the invention, The at least one acid to modify the polar OH-terminated hyperbranched polymer may be selected from the group consisting of propionic acid, hexanoic acid, octanoic acid, and decanoic acid (also referred to herein as "Dec") in an amount depending on the generation number of the hyperbranched polymer and the percent of hydroxyl ends to be modified. The at least one acid is available from commercially available sources, such as from Aldrich Chemical Company, Inc., Milwaukee, Wis. The stoichiometric amount of acid used was calculated based on the number of hydroxyl ends in the hyperbranched polymer being used (i.e, the generation number) and the percentage of hydroxyl ends to be modified. For example, a mole of substance in grams, known as a gram-mole, is the quantity of an acid that will react with all of the hydroxyl ends of one gram-mole of a hyperbranched polymer. This amount of substance is known as a stoichiometric amount. To ensure that all of the hydroxyl ends are reacted with the acid, a small amount of additional acid is normally used. In this case, 5% more is used and is referred to as 105% of the stoichiometric amount.

The next property to determine is how many grams are in a gram-mole of a substance. This number is based on the atomic weight of each element making up the substance. For decanoic acid, as an example, this number, known as the molecular weight, is 172.27 grams per gram-mole. The molecular weight of a hyperbranched polymer with 16 hydroxyl ends is typically provided by the manufacturer. In this case it is 1750 grams per gram-mole.

In this example, 79.6 grams of hyperbranched polymer are reacted. This is 79.6 grams divided by 1750 grams per gram-mole which equals 0.0455 gram moles of polymer. All 16 ends of the polymer may be reacted. Thus 16×0.0455 gram-moles=0.7278 gram-moles of acid are needed which is the stoichiometric amount. However, an additional 5% of acid may be added to ensure the completeness of the reaction with the hydroxyl ends. This amount is 0.7278×1.05=0.764 gram-moles of acid. Since the decanoic acid contains 172.27 grams per gram-mole, the amount of acid addition to take the reaction to completion is 172.27 grams per gram mole× 0.764=131.6 grams. A similar calculation may be performed to determine the stoichiometric amount of other acids that may be used for modification.

The at least one added solvent may be selected from the group consisting of Methyl ethyl ketone (MEK), Methyl n-amyl ketone (2-heptanone) (MAK), Methyl isoamyl ketone (5-methyl-2-hexanone) (MIAK), Methyl isobutyl ketone (MIBK), mixed alcohols, toluene, and xylene (XYL), combinations thereof, or the like.

Experimental Methods

Hyperbranched Polymer Selection and Preparation

A series of hyperbranched polyols, the Boltorn H series, were purchased from Perstorp (Toledo, Ohio). The hyperbranched polymers were selected based on hydroxyl count and cost. Although hyperbranched polymers with higher hydroxyl counts are available, those in the Boltorn H series available from Perstorp (Toledo, Ohio) were used to keep costs in a range that would be economically viable. Perstorp categorizes their hydroxyl end hyperbranched polymers as follows: Generation 1 refers to polymers with 16 hydroxyl ends, Generation 2 has 32 hydroxyl ends, Generation 3 has 64 hydroxyl ends and Generation 4 has 128 hydroxyl ends. Balancing structural (entanglement) and cost issues, the preferred polymers are the Second Generation hyperbranched polymers, although higher generations may be used. It is also to be appreciated that hyperbranched polymers from other than Perstorp may be used within the confines of the invention.

The purchased polymers had problems with solubility in typical solvent based auto refinishing solvents and also had hydroxyl numbers far in excess of what is appropriate for typical polyurethane formulations. Therefore, reduction of the hydroxyl number was accomplished via chemical reaction with a series of organic acids that were selected for this purpose. Acids tested for reactivity included propionic acid, hexanoic acid, octanoic acid, and decanoic acid. The goal of the exploratory research was to achieve a partial, pre-determined extent of reaction of the hydroxyl functionalities in the resin. The reaction mixed a stoichiometrically calculated known molar amount of acid with a known molar amount of the hyperbranched polymer in the presence of heat in an inert environment. The at least one acid selected from the group consisting of propionic acid, hexanoic acid, octanoic acid, and decanoic acid was used in an amount stoichiometrically sufficient to convert 0-100% of the surface functionality of the resin. The preferred amount of the surface functionality that is converted is determined by the properties of the coating produced. Experimentation to determine the desired coating properties is necessary to produce a coating meeting all ASTM test requirements.

The experimental apparatus is shown in FIG. 1. A 3-necked flask was used as follows: a gas inlet tube adapter with a low nitrogen flow was placed in the left neck, a thermometer was mounted in the right neck, and a straight connecting adapter with a 20 ml Barrett distilling receiver (water trap) and an Allihn condenser was connected to the center neck.

The 3-necked flask containing only the hyperbranched polymer was heated to reach a temperature between 125 and 130° C., at which point the HBP melted into a viscous liquid. If a block of material was supplied, rather than pellets, it would have to be cut into pieces to enhance the speed of melting. Next, the stoichiometrically determined amount of organic acid was added; toluene (15 ml) was also added as an azeotropic solvent to facilitate the condensation and evaporation process during the reaction. Nitrogen was slowly purged through the system after the melting of the polymer to keep the environment inert. The temperature was maintained between 130° C. and 135° C. during the reaction. The progress of the reaction was determined empirically by hydroxyl number determination.

Using different combinations of acids and hyperbranched polymers, several reaction products were prepared and tested for solubility and viscosity. The Generation 2 (G2)/decanoic acid material or modified hyperbranch polymer with a molecular weight of 2100 g/mol, had better solubility and lower viscosity when compared to other combinations. The hydroxyl number was calculated to be 192, reduced from 510. Batch to batch variability of the prepared modified hyperbranched polymers was monitored by periodic comparison of hydroxyl number values. Significant variation caused a batch to be deemed unacceptable.

Analysis of Commercial Coatings

Two commercial coatings meeting the California reduced-VOC limit of 3.5 lb/gal. were selected as templates to determine performance objectives for the novel reduced-VOC coatings using hyperbranched polymers. Sherwin-Williams Sunfire® was selected as the template for the single-stage formulation. A DuPont two-stage basecoat, Chromabase® B8550K, and its associated clear coat (HC 7600S) were selected as the template for the two-stage work. Both the Sherwin-Williams® and DuPont® coatings are acrylic/polyurethane-type systems. In the case of the two-stage coating, the basecoat was the focus of the reformulation work.

The specific objectives for the novel reduced-VOC coatings as determined based on performance of the two commercial coatings are listed below in Table 1-2:

TABLE 1-2

Objectives for Novel Alternative Coatings

| Parameter | Description | Acceptable Criteria |
|---|---|---|
| VOC Content | Aggregate VOC content of prepared alternative coatings | >20% solvent reduction when compared with the commercial coating |
| Viscosity | Pouring viscosity of prepared coating | Equal to or less than commercial homologue |
| Film Thickness | Film thickness of coated panel | 2.3-2.7 mil (aggregate for two-stage coatings) |
| Gloss | Gloss of coated panel measured at 20° and 60° | >80 for 20° and >90 for 60° |
| Impact Resistance | Impact resistance of coated panel (direct and reverse) | Equal to or better than commercial coating |
| Flexibility | Flexibility of coated panel after conical mandrel test | No cracking noticed at the ¼" bend |
| Adhesion | Adhesion rating of coated panel based on tape test | >95% adherence (4B or higher rating) |
| Pencil Hardness | Hardness of the coating sprayed onto the test panel | Greater or equal to the commercial coating |

The selected commercial coatings were analyzed for their solvent content, including any exempt solvents, and pigment and resin content as follows:

Determination of Volatile Content in the Commercial Coatings:

The selected commercial coatings were analyzed for volatile content by EPA Method 24 and by GC/MS (Gas chromatography/mass spectroscopy) using EPA Method 311, both methods incorporated herein by reference.

Method 24

Toluene was added to a preconditioned aluminum weighing dish to disperse the coating; a weighed sample of either 0.3 or 0.5 grams of coating was added, depending on the expected volatile content. The samples were allowed to stand for 24 hours and then placed in a forced draft oven for one hour at 100° C. After cooling to ambient temperature in a desiccator, the samples were weighed on a Mettler AE 50 balance. The volatile percent was calculated as follows:

$$\% VM = 100 - \{[(W_2 - W_1)/S] \times 100\} \quad (1)$$

where

% VM=percent volatile matter $W_1$=weight of dish, g $W_2$=weight of dish plus sample after heating, g S=sample weight, g The analysis was run in duplicate, and an average value reported. All samples were weighed with a precision of ±0.1 g.

In conjunction with Method 24 analysis, densities were determined by ASTM D1475 (1998), incorporated herein by reference. Coatings were placed in standard density cups of known volume and weighed to determine the density. Samples were analyzed in duplicate.

Method 311

For regulatory purposes, the VOC content is calculated less water and any exempt solvents (South Coast AQMD, Rule 1151, incorporated herein by reference)

$$VOC(g/L) = \frac{W_s - W_w - W_{es}}{V_m - V_w - V_{es}} \quad (2)$$

where $W_s$=weight of volatile components in grams $W_w$=weight of water in grams $W_{es}$=weight of exempt solvent in grams $V_m$=volume of material in liters $V_w$=volume of water in liters $V_{es}$=volume of exempt compounds in liters For a two-stage, basecoat/clearcoat system, the VOC content of the coating system, $VOC_{ms}$ (multi-stage), is calculated as follows:

$$VOC_{ms} = \frac{VOC_{bc} + 2VOC_{cc}}{3} \quad (3)$$

where $VOC_{bc}$=VOC content of basecoat, less water and exempt solvents $VOC_{cc}$=VOC content of clearcoat, less water and exempt solvents In order to determine whether exempt solvents were present, the commercial coatings were analyzed for specific volatile components using EPA Method 311. After mixing each sample for homogeneity, a 0.05 gram portion was added to a tared amber vial. Immediately after weighing, a 5 ml portion of dimethylformamide and an aliquot of a d10-p-xylene surrogate were added. Each sample was shaken for 2 minutes and allowed to settle. Samples that still had a colored tint after 2 minutes were centrifuged for 30 minutes to remove the cloudy appearance. A 1 ml portion from each 5 ml sample was added to a graduated amber injection vial. An aliquot of d10-toluene internal standard was added prior to injection into the GC/MS system.

Scoping runs were done using a baseline calibration consisting of components thought to be present in all coatings. This served as a guideline that was developed and used to quantify the samples for a more comprehensive list of 26 target analytes. The new target list encompassed all significant target analytes and tentative identified compounds (TICs) that were noticed from the scoping runs and available literature data. A calibration range between 200 and 3000 nanograms (ng) was established prior to sample analysis. Because a 20:1 inlet split was used, this equated to between 10 and 150 ng on the column. The high split decreased the amount of DMF (Dimethyl formamide) solvent on column, which greatly enhanced the peak shape (due to less solvent interaction), and also extended the calibration range. This calibration extension facilitated the quantification for many of the targets and decreased the amount of dilutions that needed to be made.

Determination of Pigment and Resin Content in the Commercial Coatings:

Pigment content of the selected commercial coatings was determined by Reference Method ASTM D-2698 (1990), incorporated herein by reference. Coating samples were centrifuged for 95 minutes to separate the pigment and resin fractions. Once separated, the resin solids content was determined by EPA Method 24 (see above). The gravimetric difference between the non-volatile content of the entire coating and the non-volatile content of the resin portion was then determined and pigment content calculated as:

$$P(\%) = (A-B)*100/100-B \quad (4)$$

where

P=pigment

A=nonvolatile content of coating, %

B=nonvolatile content of separated vehicle, %

The resin content for the associated clear coat was obtained by determining the non-volatile content of the clear coat, which consisted of an acrylic resin and solvent, by Method 24.

Determination of Viscosity in the Commercial Coatings:

Viscosity was determined according to Reference ASTM D-1200 (1994) (incorporated herein by reference) using a Number 2 Zahn cup. The cup was filled with the coating being tested and the amount of time taken for the coating to empty out of the cup through the hole in the bottom was measured. Viscosity measurements were performed in duplicate.

VOC and Viscosity Results for Sherwin Williams Commercial Coating (Single Stage):

The pigment and resin content were 27 and 37 percent, respectively. Analysis by Method 24 determined a total VOC content of 3.85 lb/gallon for the Sunfire® coating, which is somewhat higher than the 3.5 lb/gal listed on the MSDS (Material Safety Data Sheets). Method 311 analysis determined that none of the current list of exempt solvents was found; therefore the Method 24 value needed no correction to obtain the 'regulatory' VOC content (see equation 2).

VOC and Viscosity Results for (DuPont Chromabase® (Two-Stage Formulation):

As with the single-stage formulation, Method 24 and Method 311 analyses were performed on the DuPont Chromabase®. Method 24 gravimetric analysis yielded a VOC content of 5.1 lb/gallon. Meanwhile, a method 311 analysis determined that 9.62% of this VOC content was acetone, an exempt solvent; the VOC content minus exempt solvent was calculated to be 5.0 lb/gallon. The pigment and resin content were determined to be 22 and 18 percent, respectively. A mass balance of 105% was determined by addition of the pigment, resin, and the method 24 data. The viscosity of the DuPont Chromabase Two-Stage Formulation is found in Table B-2.

Formulation of Reduced Solvent Coatings

Once the pigment, resin and VOC/additives content were determined in the commercial coatings, four formulations as set forth below were prepared using commercially available acrylic/urethane type resins. The pigment to resin ratio determined from the parent coating was maintained in the reduced VOC alternatives; this limited formulation flexibility somewhat but was done for comparison purposes. Three different stepwise additions of the titanium dioxide pigment, resin and solvent/additives were performed. Small stepwise additions followed by shaking allowed for maximum homogeneity of the coating.

The amount of the isocyanate co-reactant can be calculated from the data supplied by the resin manufacturer's data sheet. This sheet states the amount and type of co-reactant required for use with a given quantity of their product. By calculating the ratio of the given quantities and mixing appropriate quantities of both the basecoat or resin and the hardener (Desmodur 3300A (Bayer Inc., Pittsburgh, Pa.)), proper cross-linking was achieved.

For both the single-stage and two-stage formulations, four sets of alternative coatings were prepared:

1. A reconstructed version of the commercial coating using commercially available resins, with zero solvent reduction and no hyperbranched polymer (the parent homologue).
2. An alternative coating with 40 percent solvent reduction and no added hyperbranched polymer.
3. An alternative coating with 40 percent solvent reduction and 2% added modified hyperbranched polymer (G2/dec).
4. An alternative coating with 40 percent solvent reduction and 4% added modified hyperbranched polymer (G2/dec).

1. Formulation of Base Case (the Parent Homologue)

Once the pigment, resin and VOC/additives content were determined in the selected commercial coatings, base case formulations were prepared that contained a similar composition to the commercial coatings. The base case formulations contained a similar composition of pigment, resin and solvent to the Sunfire®coating. The total amount of solvent was a composite of two different sources, solvent from the resin and the amount of "added solvent". For example, the Cognis192BL80 resin contained 80% resin solids and 20% solvent. The solvent contained in the resin was subtracted from the total amount of the solvent and additives to be added to the alternative coating.

These analogues were subjected to the same suite of tests as the commercial coatings, and used as the base case for comparison with the novel hyperbranched polymer-substituted coatings.

2. Formulation of Reduced Solvent Coatings

Next, reduced VOC coatings were prepared. The test plan called for reduction of the amount of "added solvent" by 40 percent. This put the total amount of VOC in the 3.0-3.1 lb/gallon range yielding a total VOC reduction of 21 percent relative to the Sunfire® GC-39567A. Moreover, each reduced VOC coating had 11% more pigment and resin because of the need to replace the VOC amount that was reduced. This volume was replaced by adding the same ratio of the reduced VOC coating back up to full scale. Since the coverage is relative only to the amount of pigment and resin present, greater solvent reduction can be achieved from an application standpoint.

3. Formulation with 40 Percent Solvent Reduction and 2% Added Modified Hyperbranched Polymer and
4. Formulation with 40 Percent Solvent Reduction and 4% Added Modified Hyperbranched Polymer The base formulation was then substituted with 2% and 4% by weight of the modified hyperbranched polymer, which is equivalent to up to 11% of the resin. (Some formulations were also prepared with 6 percent HBP, although this was not determined to be cost-effective for commercial production.) Hyperbranched polymers were selected based on hydroxyl count and cost. Although hyperbranched polymers with higher hydroxyl counts are available, those in the Boltorn H series available from Perstorp (Toledo, Ohio) were used to keep costs in a range that would be economically viable. Perstorp categorizes their hydroxyl end hyperbranched polymers as follows: Generation 1 refers to polymers with 16 hydroxyl ends, Generation 2 has 32 hydroxyl ends, Generation 3 has 64 hydroxyl ends and Generation 4 has 128 hydroxyl ends. Balancing structural (entanglement) and cost issues, the preferred polymers are the Second Generation hyperbranched polymers, although higher generations may be used. It is also to be appreciated that hyperbranched polymers from other than Perstorp may be used within the confines of the invention.

The formulation shown in Table 1-3 is an example of a reduced VOC solvent-based coating that has 2% w/w of modified HBP substituted for part of the resin. In order to keep the resin solid percentage constant, a proportional amount of the resin was removed to make room for the partially esterified (G2/decanoic acid product). Slight modification to the amount of Desmodur 3300A hardener was needed for proper cross-linkage, due to the higher hydroxyl number of 192 for the modified HBP, as is known by one skilled in the art.

TABLE 1-3

Sample Modified HBP, Reduced VOC Coating

| | Amount (g) |
|---|---|
| F0048B1S1 | |
| G2/Dec modified polymer | 20.01 |
| 192BL80 high solids acrylic resin | 82.55 |
| Solvating medium MAK | 111.89 |
| TiO2 Pigment | 270.16 |
| Wetting agent-Anti Terra U (Byk Chemie) | 8.45 |
| Modaflow ® Resin Modifier (Cytec, Smyrna, GA) | 14.01 |
| CAB solution (Eastman Chemical, Kingsport, TN) | 14.01 |
| Shake 20 minutes | |
| If okay, go to next step | |
| 192BL80 high solids acrylic resin | 82.55 |
| Shake 5 minutes | |
| If okay, go to next step | |
| Solvating medium MAK | 23.98 |
| Solvating medium MEK | 23.98 |
| 192BL80 high solids acrylic resin | 247.65 |
| Zn catalyst | 0.78 |
| Total | 900.00 |
| Part B | |
| Desmodur 3300 A hardener | 189.22 |

For the double stage tests, reduced VOC baseline homologues were prepared and tested using the Cognis 192BL80 and Joncryl resins, since those were the most successful in the single-stage work. Total VOC content for the reduced VOC alternative basecoats was 3.5 lb/gallon. Because of observed lower pouring viscosity values relative to the parent DuPont® base coat, further solvent reduction could potentially have been achieved. In addition, the lower viscosity allowed the coating to be sprayed with 75% less than the recommended amount of solvent addition.

Alternative coatings containing modified HBPs were again substituted for the resin at 2 and 4% by weight (6.5 and 13% of the resin portion respectively). The viscosity of the reduced VOC coating (33 seconds-Zahn#2 for sample BCC015) was lower than the "non-reduced" DuPont Chromabase® B8550K (59 seconds-Zahn #2). This implies that further reduction could have been achieved, if time/scope permitted.

An alternative clear coat, "Clear 2", was also formulated with a VOC content of 3.6 lb/gal. While the viscosity was greater than the DuPont® clear (28 seconds Zahn #2 as opposed to 19 seconds Zahn #2), no problems were noticed during spraying.

ASTM and Weathering Tests:

The coatings were prepared and sprayed onto test substrates, and evaluated for performance by standard ASTM and weathering tests, which are incorporated herein by reference.

Mechanical Testing:

The formulated coatings were tested for dry film thickness, impact resistance, adhesion, gloss, density, viscosity, flexibility, and pencil hardness, using test panels coated with the formulations under evaluation. These tests were performed using standard ASTM methods, which are incorporated herein by reference.

Test panels made of cold-rolled steel were purchased from Q-panel Lab Products (Cleveland, Ohio). The dimension of each test panel was 4"×12"×0.032". One side of the test panel was polished with an abrasive until the mill surface was completely removed. This results in a polished smooth test surface.

Each coating and formulation tested was sprayed on to test panels using an HVLP (High volume low pressure) gun. Viscosity and density measurements of the sprayed coating were also made at this time. Coated panels were dried for seven full days in an air-conditioned lab prior to performance testing to ensure adequate drying.

Dry Film Thickness

Dry film thickness of the coating on the test panel was determined using reference ASTM D-1186 (2001), incorporated herein by reference. The method uses a commercially available eddy current instrument, such as the MP-20 model from Fisher Scientific. The instrument was calibrated using Mylar foils of known thickness. The thickness of each calibration foil or shim was determined at Fisher before shipment using a Tesatronic TTD 60 digital indicator gauge. A calibration check was performed prior to testing for each set of panels, using a foil that matched the anticipated thickness of the coating.

Gloss

Gloss was determined according to Reference ASTM D-523 (1989), incorporated herein by reference. Measured gloss ratings were obtained by comparing the specular reflectance from the coated test panel to that of a black glass standard. Gloss values were considered passable if the value exceeded 80 gloss units measured at 20° and if the value exceeded 90 gloss units measured at 600.

Impact Resistance

A Gardner Heavy Duty Variable Height Impact Tester, IG-1120, was used to determine the impact resistance of each coating. The tester consists of a cast aluminum base, a slotted vertical guide tube, a round-nosed punch (tup), a punch holder, two cylindrical steel weights, a die, and a cylindrical die support. The punch is ⅝ inch in diameter; the inside diameter of the die is 0.64 inch. The IG-1120 is supplied with a two-pound weight. The two-pound ball is lifted to specific heights and allowed to crash into the coated test substrate. The amount of cracking observed near the impact site was used to determine if the coating passes or fails at a particular height. For pass/fail criterion purposes, direct comparison of the test coating against the parent homologue was the final determination. Reference ASTM D-2794 (1993), incorporated herein by reference, describes the procedure used by the laboratory to perform impact resistance.

Adhesion

Adhesion tests were performed using ASTM D-3359 (2002), incorporated herein by reference. This method is a test procedure for assessing the adhesion of coating films to metallic substrates by applying and removing pressure-sensitive tape over cuts made in the film. Ratings are based on the percentage of coating that is removed by the tape; ratings range from 5B (0% removed) to 0B (>65% removed). Passing values were given to the coatings if greater than 95% of the coating remained attached to the substrate after testing (rating 4B or higher).

Flexibility

Flexibility was determined by bending the coated panel to a ¼-inch bend using a conical mandrel manufactured by Gardner. The panel was bent over the mandrel with the uncoated side of the panel in contact with the mandrel surface. The panel is bent approximately 180° around the mandrel at a uniform velocity time of 1 second. If the coating did not show signs of breaking at this bend, it was given a 'pass' value. Specific information regarding flexibility testing is found in Reference ASTM D-522 (1993), incorporated herein by reference.

Pencil Hardness

Pencil hardness determines the relative hardness of each coating by subjecting it to pencils of varying hardness. The pencil was sharpened by rubbing it perpendicular to the surface of No. 400 carbide abrasive paper, and placing it in a holding device that had a total weight of 500 grams. This device allowed the pencil to be held at an angle of 45° to the substrate. The hardest pencil that failed to scratch the coating was the value used as pencil hardness. The pencil hardness values run from hardest to softest as follows: 2H, H, F, HB, B, 2B, 4B, 5B and 6B. A formulated coating was considered passable if it met or exceeded the pencil hardness of the parent coating. Specific details can be found in Reference ASTM D-3363 (2000), incorporated herein by reference.

Weathering Study

Single-stage formulations that passed the mechanical tests described above were submitted to Atlas (Chicago, Ill.) for an accelerated weathering study. The weathering study was performed to assess the weathering capability of reduced VOC formulations with regard to gloss and yellowness index. Nine panels including the original Sunfire® coating and six of the alternative VOC formulations were submitted; two were run in duplicate. All panels were subjected to 1000 hours of UV radiation. Using the ASTM G155-98/cycle 1 criterion (1998), each panel was subjected to cycles of 102 minutes of xenon arc then 18 minutes of de-ionized water via spray along with the xenon radiation. This simulates precipitation cycles that naturally occur during atmospheric conditioning.

A comparison was made between the initial gloss values and those after accelerated weathering. Gloss measurements were also made in-house before and after the panels were submitted. There was a discrepancy in some of the gloss values from Atlas; the gloss values appeared to increase with weathering. Therefore, the before-and-after values measured in-house are presented here. Table 2 summarizes the results. The average reduction in gloss over the course of the weathering study was 17% at 60° and 45% at 20°. All of the panels demonstrated slightly better gloss retention at 20° than the Sunfire® panel. Two panels, samples F0047R2S2 and F0048R1 S1, demonstrated comparable gloss retention at 60° over the course of the weathering study. A visual inspection also confirmed that these two samples weathered as well or better than the original Sunfire® coating. All of the other panels had somewhat lower gloss retention than the Sunfire® panel.

The yellowness index is a measure of how far a white coating deviates from pure white. A positive value represents a deviation toward the yellow range of the spectrum, while a negative value represents a deviation toward blue. The Sunfire® coating had a slight yellowness initially; after weathering the yellowness actually decreased somewhat. The alternative coatings all had negative values initially, which became less negative after yellowing. The yellowness index values were generally within an acceptable range.

TABLE 2

1000 Hour Weathering Comparison

| | | 20° Gloss | | | 60° Gloss | | | Yellowness Index | |
|---|---|---|---|---|---|---|---|---|---|
| Sample | % HBP | Initial | Final | % Reduction | Initial | Final | % Reduction | Initial | Final |
| White Sunfire | — | 83 | 51 | 38.1 | 93 | 84 | 9.7 | 0.62 | 0.46 |
| F0071R1S1 | 4 | 85 | 46 | 43.8 | 94 | 79 | 15.6 | −0.41 | −0.05 |
| *F0047R2S2* | *0* | *87* | *68* | *31.7* | *95* | *88* | *9.9* | *−1.44* | *−0.70* |
| *F0048R1S1* | *2* | *87* | *63* | *26.7* | *95* | *86* | *9.4* | *−0.76* | *−0.02* |
| F0049R2S1 | 4 | 84 | 48 | 40.9 | 94 | 80 | 14.7 | −1.04 | −0.40 |
| F0049R1S2 | 4 | 86 | 37 | 56.3 | 95 | 76 | 20.0 | −0.56 | 0.08 |
| F0052R1S1 | 4 | 86 | 36 | 59.5 | 95 | 75 | 22.2 | −0.63 | 0.50 |
| F0052R2S1 | 4 | 85 | 40 | 51.1 | 94 | 77 | 17.9 | −0.46 | 0.07 |
| F0054R2S1 | 0 | 87 | 30 | 64.8 | 96 | 70 | 27.4 | −0.64 | 0.38 |

Samples in italics means that the reduction in gloss after weathering was better than the original from 20° gloss.

Results (Tables A-1 and B-1):

All of the polymer and coating-related samples were prepared in-house. Two types of samples were generated for testing. The first type of sample generated was the formulated coatings, and aliquots of the formulations and commercial coatings used for analysis. The second type of sample was the coated test panel. All test panels were logged into a computer database and given a formula code, starting with F0001 and proceeding upward to F0002, F0003 and so on for the single stage. BCCC stands for basecoat/clearcoat for the DuPont two-stage work. The letters "A", "B" and "C" represent that 25%, 50% and 100% of the solvent was used in the spraying process. Therefore, the A's used less overall solvent than the B's and the B's used less than the C's. The template type used, resin choice, modified hyperbranched polymer substitution identification and percentage used, and VOC reduction were recorded. Full test results for the single stage formulations as compared with the Sunfire® original commercial coating are shown in Table A-1. Full test results for the double stage formulations as compared with the DuPont original commercial coating are shown in Table B-1.

The formulation "passed" if the coating matched or exceeded the acceptable criteria as set forth in Table 1-2 of all ASTM tests. For the single-stage coatings, several of the alternative coating formulations met the criteria of equal or better ASTM properties compared with the Sunfire® original. All of the alternative formulations had adhesion values that were equivalent to the parent Sunfire® coating, and all but one passed the flexibility test. The properties that were more difficult to achieve were gloss, impact resistance and pencil hardness. A total of twelve formulations passed all ASTM tests. All of the successful coatings were those that used either the Cognis192BL80, the Joncryl 510 or the Joncryl 920 resin. However, only the formulations made with the Cognis192BL80 resin were successful when the modified hyperbranched polymer was added.

For the two-stage coatings, two of the alternative basecoat formulations, one containing HBP, had ASTM results for gloss, adhesion, impact resistance, and flexibility that were as good or better than the DuPont® coating. The alternative clearcoat also passed most of the ASTM tests; however, it was not tested for pencil hardness.

The following references as referred to herein are all incorporated herein by reference:

ASTM D-522, *Standard Test Methods for Mandrel Bend Test of Attached Organic Coatings*, ASTM International, West Conshohocken, Pa., 1993.
ASTM D-523, *Standard Test Method for Specular Gloss*, ASTM International, West Conshohocken, Pa., 1989.
ASTM D-1186, *Standard Test Methods for Nondestructive Measurement of Dry Film Thickness of Nonmagnetic Coatings Applied to a Ferrous Base*, ASTM International, West Conshohocken, Pa., 2001.
ASTM D-1200, *Standard Test Method for Viscosity by Ford Viscosity Cup*, ASTM International, West Conshohocken, Pa., 1994.
ASTM D-1475, *Standard Test Method for Density of Liquid Coatings, Inks and Related Products*, ASTM International, West Conshohocken, Pa., 1998.
ASTM D-2698, *Standard Test Method for Determination of the Pigment Content of Solvent-Reducible Paints by High-Speed Centrifuging*, ASTM International, West Conshohocken, Pa., 1990.
ASTM D-2794, *Standard Test Method for Resistance of Organic Coatings to the Effects of Rapid Deformation (Impact)*, ASTM International, West Conshohocken, Pa., 1993.
ASTM D-3359, *Standard Test Methods for Measuring Adhesion by Tape Test*, ASTM International, West Conshohocken, Pa., 2002.
ASTM D-3363, *Standard Test Method for Film Hardness by Pencil Test*, ASTM International, West Conshohocken, Pa., 2000.
ASTM G-155, *Standard Practice for Operating Xenon Arc Light Apparatus for Exposure of Non-Metallic Materials*, ASTM International, West Conshohocken, Pa., 1998.
Federal Register, Volume 63, Number 176, National Volatile Organic Compound Emission Standards for Automobile Refinish Coatings, pp. 48806-48819, Sep. 11, 1998.
South Coast Air Quality Management District, Rule 1151: Motor Vehicle and Mobile Equipment Non-Assembly Line Coating Operations, Amended Dec. 11, 1998. (http://www.aqmd.gov/rules/html/r1151.html).
U.S. EPA, *National Air Quality Emissions Trend Report, 2003 Special Studies Edition*, U.S. Environmental Protection Agency, Office of Air Quality Planning and Standards, Research Triangle Park, N.C., EPA-454/R-03-005.

CONCLUSIONS

Table 3 summarizes the VOC reductions that were achieved for the single-stage and two-stage work. A reduction of 22% was achieved for the single-stage coating. An overall reduction of 34% for the two-stage basecoat/clearcoat system was achieved, when calculated by equation 3. Overall, the alternative two-stage coating had 34% less VOC (less exempts) when compared to the "off the shelf" DuPont coating.

TABLE 3

Solvent Reduction in Auto Refinishing Coatings

|  | Single-stage | Two-stage |
|---|---|---|
| % HBP (wt) | 2 | 2 |
| Initial VOC (less exempt solvents, lb/gal) | 3.8 | 5.0 |
| Final VOC (lb/gal) | 3.1 | 3.6 |
| % reduction | 22 | 34 |

Novel coatings that contain between 3.0 and 3.5 lb/gallon VOC have been prepared for single-stage and two-stage systems. This represents a significant reduction in the amount of solvent needed to effectively spray these coatings. The single-stage research demonstrated that a greater than 22 percent reduction from a reduced-VOC commercial paint, from 3.9 lb/gal to 3.1 lb/gal, could be achieved without compromising mechanical properties of the coating. For the single stage coating, a "reduced VOC coating" means a coating having 3.2 lbs/gallons or less VOC. Moreover, even greater solvent reduction is achieved from a coverage standpoint because the alternative low VOC coatings had a greater pigment and resin content.

Two-stage alternatives were prepared that had total VOC values around 3.5-3.6 lb/gallon. This value could be improved by further solvent reduction and solvent replacement/optimization. Like the alternative single-stage basecoats, the two-stage alternative coatings can also achieve even greater solvent reduction from an application standpoint. In addition, only 25% of the recommended amount of "added solvent" was needed to spray the 2-stage basecoats. Reducing solvent in the clear coat was not a primary focus for this work; however an alternative clear coat was prepared at 3.6 lb/gallon without any solvent optimization or replacement of exempt solvents. The alternative, "Clear 2", was sprayed and passed all performance tests (pencil hardness was not tested).

Reduced-solvent coating formulations with high-solids resins and no HBP met the criteria as set forth in Table 1-2. Coatings with reduced solvent can also be formulated using hyperbranched polymers to further reduce the amount of solvent necessary.

From the foregoing, it is to be appreciated that VOC emissions from coating operations may be lowered by using high solid resins and using chemically modified hyperbranched polymers to replace a portion of the resin to significantly reduce VOC load while maintaining or exceeding coating performance. The novel reduced-VOC coatings substantially comply with the ASTM standards for coatings. The hyperbranched polymers make the coatings substantially more fluid, improving flow characteristics, and enhancing the coating to make them stronger and more durable. Such chemically modified hyperbranched polymers will allow as much as about 30% less solvent to be used while maintaining a viscosity that allows adequate spray characteristics. The use of chemically modified hyperbranched polymers are capable of lowering the viscosity of a solvent-borne coating system while becoming part of the final coating matrix.

Although a particular embodiment of the invention has been described in detail for purposes of illustration, various modifications may be made without departing from the spirit and scope of the invention. Accordingly, the invention is not to be limited, except as by the appended claims.

We claim:

1. A reduced Volatile Organic Compound coating, comprising:
   at least one pigment;
   at least one resin, wherein a portion of the at least one resin comprises at least one thermoplastic polymer and wherein another portion of the at least one resin comprises at least one modified hyperbranched polymer, the modified hyperbranched polymer comprising a polar hyperbranched polymer that has been esterified by at least one organic acid; and
   at least one added solvent;
   wherein the modified hyperbranched polymer is prepared by:
      providing a given thermoplastic polymer resin;
      providing a polar hydroxyl terminated hyperbranched polymer, the hyperbranched polymer having a viscosity lower than a viscosity of the linear thermoplastic polymer of the given resin;
      determining a number of hydroxyl ends in the hyperbranched polymer;
      determining a percentage of the hydroxyl ends to be modified;
      determining a stoichiometric amount of at least one acid to be used to modify the polar hydroxyl terminated hyperbranched polymer, the stoichiometric amount being calculated according to the number of hydroxyl ends in the hyperbranched polymer and the percentage of hydroxyl ends to be modified; and
      esterifying the polar hyperbranched polymer by adding the determined amount of the at least one acid to the polar hyperbranched polymer; and
      replacing a portion of the linear thermoplastic polymer in the given resin with the at least one modified hyperbranched polymer; and
   wherein up to about 13% of the linear thermoplastic polymer is replaced by the at least one modified hyperbranched polymer.

2. The reduced VOC coating of claim 1, wherein the reduced VOC coating comprises:
   the at least one pigment in an amount between about 28% to about 32% by weight of the reduced VOC coating;
   the at least one resin in an amount between about 34% to about 39% by weight of the reduced VOC coating, which includes the linear thermoplastic polymer in the given resin and the at least one modified hyperbranched polymer that has replaced a portion of the linear thermoplastic polymer in the given resin; and
   the at least one added solvent in an amount between about 15% to about 20% by weight of the reduced VOC coating.

3. The reduced VOC coating of claim 2, wherein the at least one pigment comprises about 30% by weight of the reduced VOC coating, the at least one resin comprises about 37% by weight of the reduced VOC coating, and the at least one added solvent comprises about 18% of the reduced VOC coating.

4. The reduced VOC coating of claim 1, wherein the reduced VOC coating comprises:
   the at least one pigment in an amount between about 33% to about 39% by weight of the reduced VOC coating;
   the at least one resin in an amount between about 35% to about 40% by weight of the reduced VOC coating which includes the linear thermoplastic polymer in the given resin and the at least one modified hyperbranched polymer that has replaced a portion of the linear thermoplastic polymer in the given resin; and
   the at least one added solvent in an amount between about 20% to about 25% by weight of the reduced VOC coating.

5. The reduced VOC coating of claim 4, wherein the at least one pigment comprises about 37% by weight of the coating, the at least one resin comprises about 39% by weight of the reduced VOC coating, and the at least one added solvent comprises about 22% of the reduced VOC coating.

6. The reduced VOC coating of claim 1, wherein the at least one modified hyperbranched polymer has replaced about 2% to about 6% by weight of the linear thermoplastic polymer in the given resin.

7. The reduced VOC coating of claim 1, wherein the at least one resin comprises about 70% to about 85% solids.

8. The reduced VOC coating of claim 1, wherein the polar hyperbranched polymer comprises hyperbranched polymers with OH terminal functional groups and having a hydroxyl functionality between 16 and 128.

9. The reduced VOC coating of claim 1, wherein the at least one acid is selected from the group consisting of propionic acid, hexanoic acid, octanoic acid, and decanoic acid.

10. A method of reducing Volatile Organic Compounds in a given coating based on at least one linear thermoplastic polymer, at least one added solvent and at least one pigment, comprising the steps of:
   modifying the polarity of at least one hydroxyl terminated hyperbranched polymer to make at least one modified hyperbranched polymer, wherein modifying the polarity of the hyperbranched polymer comprises:
      providing a polar hydroxyl terminated hyperbranched polymer, the hyperbranched polymer having a viscosity lower than a viscosity of the linear thermoplastic polymer;
      determining a number of hydroxyl ends in the hyperbranched polymer;
      determining a percentage of the hydroxyl ends to be modified;
      determining a stoichiometric amount of at least one acid to be used to modify the polar hydroxyl terminated hyperbranched polymer, the stoichiometric amount being calculated according to the number of hydroxyl ends in the hyperbranched polymer and the percentage of hydroxyl ends to be modified; and
      adding the determined amount of the at least one acid to esterify the polar hyperbranched polymer; and
   replacing a portion of the at least one linear thermoplastic polymer in the given coating with the at least one modified hyperbranched polymer thereby reducing the amount of the at least one added solvent needed in the coating and thereby reducing Volatile Organic Compounds therein while also lowering viscosity of the given coating; and wherein the at least one modified hyperbranched polymer replaces up to about 13% of the least one thermoplastic polymer in the given coating.

11. The method of claim 10, wherein the at least one modified hyperbranched polymer replaces about 2% to about 6% by weight of the thermoplastic polymer in the given coating.

12. The method of claim 10, wherein the at least one thermoplastic polymer comprises about 70% to about 85% solids.

13. The method of claim 10, wherein the polar hyperbranched polymers comprise hyperbranched polymers with OH terminal functional groups and having a hydroxyl functionality between 16 and 128.

14. The method of claim 10, wherein the at least one acid is selected from the group consisting of propionic acid, hexanoic acid, octanoic acid, and decanoic acid.

15. The method of claim 10, wherein the coating having reduced VOCs comprises:
the at least one pigment in an amount between about 28% to about 32% by weight of the coating;
the at least one thermoplastic polymer in an amount between about 34% to about 39% by weight of the coating, including the portion thereof replaced by the at least one modified hyperbranched polymer; and
the at least one added solvent in an amount between about 15% to about 20% by weight of the coating.

16. The method of claim 10, wherein the coating having reduced VOCs comprises:
the at least one pigment in an amount between about 33% to about 39% by weight of the coating;
the at least one thermoplastic polymer in an amount between about 35% to about 40% by weight of the coating including the portion of the at least one thermoplastic polymer replaced by at least one modified hyperbranched polymer; and
the at least one added solvent in an amount between about 20% to about 25% by weight of the coating.

17. A method of reducing Volatile Organic Compounds in a given coating based on at least one linear thermoplastic polymer, at least one added solvent and at least one pigment, comprising the steps of:
modifying the polarity of at least one hydroxyl terminated hyperbranched polymer to make at least one modified hyperbranched polymer, wherein modifying the polarity of the hyperbranched polymer comprises:
providing a polar hydroxyl terminated hyperbranched polymer, the hyperbranched polymer having a viscosity lower than a viscosity of the linear thermoplastic polymer;
determining a number of hydroxyl ends in the hyperbranched polymer;
determining a percentage of the hydroxyl ends to be modified;
determining a stoichiometric amount of at least one acid to be used to modify the polar hydroxyl terminated hyperbranched polymer, the stoichiometric amount being calculated according to the number of hydroxyl ends in the hyperbranched polymer and the percentage of hydroxyl ends to be modified; and
adding the determined amount of the at least one acid to esterify the polar hyperbranched polymer; and
replacing a portion of the at least one linear thermoplastic polymer in the given coating with the at least one modified hyperbranched polymer thereby reducing the amount of the at least one added solvent needed in the coating and thereby reducing Volatile Organic Compounds therein while also lowering viscosity of the given coating;
wherein the coating having reduced Volatile Organic Compounds comprises:
the at least one pigment in an amount between about 28% to about 32% by weight of the coating;
the at least one thermoplastic polymer in an amount between about 34% to about 39% by weight of the coating, including the portion thereof replaced by the at least one modified hyperbranched polymer; and
the at least one added solvent in an amount between about 15% to about 20% by weight of the coating.

18. A method of reducing Volatile Organic Compounds in a given coating based on at least one linear thermoplastic polymer, at least one added solvent and at least one pigment, comprising the steps of:
modifying the polarity of at least one hydroxyl terminated hyperbranched polymer to make at least one modified hyperbranched polymer, wherein modifying the polarity of the hyperbranched polymer comprises:
providing a polar hydroxyl terminated hyperbranched polymer, the hyperbranched polymer having a viscosity lower than a viscosity of the linear thermoplastic polymer;
determining a number of hydroxyl ends in the hyperbranched polymer;
determining a percentage of the hydroxyl ends to be modified;
determining a stoichiometric amount of at least one acid to be used to modify the polar hydroxyl terminated hyperbranched polymer, the stoichiometric amount being calculated according to the number of hydroxyl ends in the hyperbranched polymer and the percentage of hydroxyl ends to be modified; and
adding the determined amount of the at least one acid to esterify the polar hyperbranched polymer; and
replacing a portion of the at least one linear thermoplastic polymer in the given coating with the at least one modified hyperbranched polymer thereby reducing the amount of the at least one added solvent needed in the coating and thereby reducing Volatile Organic Compounds therein while also lowering viscosity of the given coating;
wherein the coating having reduced Volatile Organic Compounds comprises:
the at least one pigment in an amount between about 33% to about 39% by weight of the coating;
the at least one thermoplastic polymer in an amount between about 35% to about 40% by weight of the coating including the portion of the at least one thermoplastic polymer replaced by at least one modified hyperbranched polymer; and
the at least one added solvent in an amount between about 20% to about 25% by weight of the coating.

* * * * *